(12) United States Patent
Melhirst et al.

(10) Patent No.: US 11,543,385 B2
(45) Date of Patent: Jan. 3, 2023

(54) ION MOBILITY FILTER

(71) Applicants: Owlstone Medical Limited, Cambridge (GB); Owlstone Inc., Westport, CT (US)

(72) Inventors: Daniel Melhirst, Cambridge (GB); Jonathan Pearson, Cambridge (GB); Max Allsworth, Essex (GB)

(73) Assignees: Owlstone Medical Limited, Cambridge (GB); Owlstone Inc., Westport, CT (US)

( * ) Notice: Subject to any disclaimer, the term of this patent is extended or adjusted under 35 U.S.C. 154(b) by 388 days.

(21) Appl. No.: 16/652,769

(22) PCT Filed: Oct. 5, 2018

(86) PCT No.: PCT/GB2018/052843
§ 371 (c)(1),
(2) Date: Apr. 1, 2020

(87) PCT Pub. No.: WO2019/069089
PCT Pub. Date: Apr. 11, 2019

(65) Prior Publication Data
US 2020/0232945 A1    Jul. 23, 2020

(30) Foreign Application Priority Data
Oct. 6, 2017   (GB) .................................. 1716348

(51) Int. Cl.
*G01N 27/62*   (2021.01)
*G01N 27/624*   (2021.01)

(52) U.S. Cl.
CPC .................................. *G01N 27/624* (2013.01)

(58) Field of Classification Search
CPC ...... H01J 49/24; H01J 49/0031; H01J 49/063; H01J 49/065; H01J 49/066; G01N 27/624
See application file for complete search history.

(56) References Cited

U.S. PATENT DOCUMENTS

| 2003/0038236 A1 | 2/2003 | Russ et al. |
| 2005/0167587 A1 | 8/2005 | Guevremont et al. |

(Continued)

OTHER PUBLICATIONS

European Patent Office, International Search Report and Written Opinion, PCT/GB2018/052843, dated Jan. 2, 2019.

(Continued)

*Primary Examiner* — Robert H Kim
*Assistant Examiner* — Hsien C Tsai
(74) *Attorney, Agent, or Firm* — Leveque Intellectual Property Law, P.C.

(57) ABSTRACT

An ion mobility filter is disclosed. The present invention relates to but not exclusively a field asymmetric ion spectrometry filter. For example, we describe an ion filter for filtering ions in a gas sample. The ion filter is comprised of a plurality of electrodes, a first ion channel, and a second ion channel. The first ion channel filters ions from a target chemical in the gas sample, defines a gap between a first pair of electrodes in the plurality of electrodes, and has a first ion channel gap width. The second ion channel filters ions from the target chemical in the gas sample, defines a gap between a second pair of electrodes in the plurality of electrodes, and has a second ion channel gap width. The first ion channel gap width is greater than the second ion channel gap width.

19 Claims, 11 Drawing Sheets

(56) References Cited

U.S. PATENT DOCUMENTS

| | | |
|---|---|---|
| 2010/0148051 A1 | 6/2010 | Hart et al. |
| 2013/0175441 A1 | 7/2013 | Zanon et al. |
| 2016/0025679 A1 | 1/2016 | Hart et al. |
| 2016/0320342 A1* | 11/2016 | Schneider ............... H01J 49/24 |

OTHER PUBLICATIONS

Krylov et al., "Temperature effects in differential mobility spectrometry," International Journal of Mass Spectrometry 279 (2009) 119-125.
Wilks et al., "Characterization of a miniature, ultra-high-field, ion mobility spectrometer," Int. J. Ion Mobil. Spec. (2012)15:199-222.

\* cited by examiner

ION MOBILITY FILTER

TECHNICAL FIELD

The invention relates to an ion mobility filter, for example, but not exclusively a field asymmetric ion mobility spectrometry filter.

BACKGROUND

Ion mobility spectrometers are used to detect particular chemicals within gases such as air. Differential mobility spectrometry (DMS) which is also known as field-asymmetric waveform ion mobility spectrometry (FAIMS) is recognised as a powerful tool for separation and characterization of gas-phase ions. Stability and repeatability of DMS spectra are important issues in the use of DMS in analytical applications, as explained for example in "*Temperature effects in differential mobility spectrometry*" by Krylov et al in International Journal of Mass Spectrometry 279 (2009) 119-125. Drift gas pressure and temperature are known to influence the field dependence of ion mobility, changing peak positions in the DMS spectra and the paper by Krylov provides a model which can be used for temperature correction of DMS Spectra.

As explained in US2005/0167587A1, an elevation in temperature leads to peaks in a CV spectrum widening due to increased ion separation. Under such conditions, two ions that are separated at room temperature may fail to be separated at 100° C. Similarly, two ions that fail to be separated at room temperature may be separated at 10° C.

The ion channel gap width is a factor that affects the performance of a FAIMS system, as explained for example in 'Characterization of a miniature, ultra-high-field, ion mobility spectrometer' by Wilks et al in International Journal of Mass Spectrometry 15 (2012) 199-222.

The applicant has also recognised the need for an alternative solution for selectively distinguishing particular chemicals.

SUMMARY

According to the present invention there is provided an apparatus as set forth in the appended claims. Other features of the invention will be apparent from the dependent claims, and the description which follows.

We describe an ion filter for filtering ions in a gas sample, the ion filter comprising: a plurality of electrodes; a first ion channel for filtering ions from a target chemical in the gas sample, wherein the first ion channel defines a gap between a first pair of electrodes in the plurality of electrodes and has a first ion channel gap width; and a second ion channel for filtering ions from the target chemical in the gas sample, wherein the second ion channel defines a gap between a second pair of electrodes in the plurality of electrodes and has a second ion channel gap width, wherein the first ion channel gap width is greater than the second ion channel gap width.

Opposed surfaces of the pair of electrodes may thus form opposed walls of an ion channel. By having channels with different gap widths, it is possible to increase the selectivity of the ion filter. This is because it is less likely that ions from multiple different samples will be able to pass through channels having different gap widths without being neutralised by one of the electrodes. For example, in a FAIMS system, it may be possible to select a particular compensation field so that only ions of a target chemical pass through both ion channels.

The ion filter may comprise an array of ion channels having at least three ion channels, wherein each ion channel in the array defines a gap between a respective pair of electrodes in the plurality of electrodes and has a respective ion channel gap width. Thus, there may be a third ion channel for filtering ions from the target chemical in the gas sample, wherein the third ion channel is formed between a third pair of electrodes and has a third ion channel gap. Similarly, there may also be a fourth ion channel between a fourth pair of electrodes and so on.

There may be multiple different ion channel gap widths and thus increasing the number of channels may provide increased sensitivity. In one arrangement, each ion channel in the array of ion channels may have a different ion channel gap width to each neighbouring ion channel. It will be appreciated that an ion channel at one side of the array will only have a single neighbouring ion channel whereas an ion channel in the middle of the array will have two neighbouring ion channels. As described below, neighbouring ion channels may be immediately adjacent to one another or separated by electrodes.

The ion channels within the array may be arranged with the ion channel having the shortest ion gap width located closer to the centre of the ion filter than each ion channel having a larger ion gap width. Typically, ions prefer to flow through the central area of an ion filter. Similarly, ions are more likely to flow through wider channels. By locating the narrower ion channels to the centre of the ion filter and the wider ion channels towards the edges of the ion filter, the ions are encouraged to flow more evenly across the breadth of the ion filter. More generally, the ion channels may be arranged with a distribution of different ion channel gap widths to match a desired profile.

The ion filter may comprise a monolithic electrode layer wherein each ion channel and/or each electrode is located within the monolithic electrode layer. This may reduce manufacturing costs and simply the manufacturing process.

The electrode layer may comprise a first electrode portion and a second electrode portion and wherein each of the pairs of electrodes comprise a first electrode located within the first electrode portion and a second electrode located within the second electrode portion. The plurality of electrodes may comprise a first and a second array of electrodes. The first electrode portion may comprise the first array and the second electrode portion may comprise the second array. The first electrode portion and hence the first array may comprise positive electrodes set at the same potential and the second electrode portion and hence the second array may comprise negative electrodes set at the same potential, or vice versa. Although there may be only two electrode portions, each electrode portion may be considered to comprise a plurality of separate electrodes. In other words, each electrode in the first or second array may be considered as a separate electrode even if they are physically connected.

The ion channels may form part of a continuous channel which divides the electrode layer into the first and second electrode portions. The first and second arrays of electrodes may thus form an interdigitated array of electrodes which may be considered to be finger-like. In an interdigitated array, each pair of neighbouring ion channels may be separated by an electrode. As above these "finger" electrodes may be considered as separate electrodes even though they are part of either the first or second electrode portion. Similarly, although there is a single channel, this may be effectively considered to be divided into portions forming separate ion channels with ions flowing separately through each ion channel. Thus, the first pair of electrodes may comprise a first electrode from the first array and a first electrode from the second array and the second pair of electrodes may comprise a second electrode from the first array and the first electrode from the second array and so on. In other words, the first and second pairs of electrodes are formed from two different combinations of three electrodes and not from four different electrodes. An interdigitated array of electrodes may thus provide a compact ion filter with a large number of ion channels. Such an ion filter may thus have increased sensitivity.

Within the interdigitated array, the gap width of each separate ion channel may taper in width from the outer edges of the array to the centre of the array. In such an arrangement, each ion channel preferably maintains a constant gap width along the length of the ion channel. By tapering the ion gap widths, the central ion channels are narrower than those towards to the edge to gain the benefit of a more even flow through the ion filter. This may result in an uneven spacing between the electrodes within each of the arrays in the interdigitated array. Alternatively, each electrode within the first array may be evenly spaced from its neighbours and similarly each electrode within the second array may be evenly spaced from its neighbours. The first and second arrays may be offset so that each neighbouring channel in the interdigitated array has a different ion gap width.

Each of the plurality of electrodes may be curved. For example, the interdigitated array may comprise a plurality of concentrically located electrodes. The plurality of electrodes may comprise electrodes having the general shape of a discontinuous hollow cylinder. Each cylinder may comprise a protrusion which is located within an indentation of a neighbouring cylinder. In this arrangement, the opposed surfaces of the pair of electrodes may respectively form the outer and inner surfaces of the cylinder.

With the interdigitated array, typically the ion channels are separated by an electrode. In another arrangement, the first and second ion channels may be in direct contact with each other thereby defining an aperture between the first and second electrode portions. Where there is an array of ion channels, each ion channel may be in direct contact to form a single aperture within the ion filter. Alternatively, the ion channels may be grouped together to form more than one aperture. In other words, there is no electrode between the ion channels in the aperture as in other arrangements. In this arrangement, the first pair of electrodes may comprise a first electrode from the first array and a first electrode from the second array and the second pair of electrodes may comprise a second electrode from the first array and a second electrode from the second array and so on. In other words, no electrode is used in more than one pair of electrodes. In this arrangement, each of the first and second electrodes form the opposed surfaces of the pair of first and second electrode portions respectively. As above, although the electrodes are effectively parts of the surfaces of the first and second electrode portions, they may be considered as separate electrodes because they are defining an ion channel. The opposed pair of electrodes may form the opposed end walls of each ion channel. The end walls of each ion channel may be smaller than the directly contacting portions of the ion channels. The ions may flow through each aperture which may also be termed a sample aperture. Where there is only a single aperture, this means that all the gas flows through together which may be advantageous.

The aperture may separate the plurality of electrodes into a first and second portion. Insulating material may also be provided between the first and second electrode portions on either side of the aperture. The aperture together with the insulating material may thus ensure sufficient electrical isolation between the electrode portions to avoid any shorting of the positive and negative electrodes.

Within the aperture, the gap width of each separate ion channel may taper in width from the outer edges of the aperture to the centre of the aperture. In this way, the central ion channels are narrower than those towards to the edge to gain the benefit of a more even flow through the ion filter. As before, the gap width within each ion channel is preferably constant throughout the length of the channel. As in other arrangements, the gap width of neighbouring ion channels may be different.

The ion filter may comprise a first array of positive electrodes and a second array of negative electrodes wherein each of the pairs of electrodes comprise a first electrode located with the first array and a second electrode located within the second array. Where there are first and second electrode portions, the first array may be within the first electrode portion and the second array within the second electrode portion. Where there are not first and second electrode portions, negative electrodes may alternate with positive electrodes and thus there may be insulating material between each positive and negative electrode on either side of the gap defined by each channel. In this way the ion channel together with the insulating material may thus ensure sufficient electrical isolation between the positive and negative electrodes to avoid any shorting of the positive and negative electrodes.

The plurality of electrodes may each be in the form of a hollow cylinder which may be concentrically located with respect to each other. The first ion channel may be part of a first set of ion channels defined between a first electrode and a second electrode and the second ion channel may be part of a second set of ion channels defined between the second electrode and a third electrode. Each set of electrodes may comprise the same number of ion channels, e.g. three, or a different number of ion channels. Each ion channel in the first set of ion channels may have the same gap width which may be greater that the gap width of each ion channel in the second set of ion channels.

As an alternative to a monolithic electrode layer, there may be a plurality of electrode layers with each electrode layer comprising at least one ion channel defined between a pair of electrodes. For example, the first electrode layer may comprise the first ion channel and the second electrode layer may comprise the second ion channel. In this arrangement, each pair of electrodes may be formed in separate layers.

As set out above, the described ion filters may be incorporated in a spectrometry system and thus we also describe an ion mobility spectrometry system comprising: an ion filter as above; an ionizer for generating the ions with the gas sample; and a detector for detecting the output from the ion filter. The detector may comprise a detecting element, e.g. a pair of detector electrodes, for each ion channel.

The system may comprise a processor configured to generate a graphical output for each ion channel; the graphical output may be based on information, e.g. ion current, which is detected by the detector. By generating a graphical output for each ion channel, an output for the target chemical is produced at two different ion channel gap widths. This may aid identification of the target chemical. The processor may be configured to generate a measurement of ion current at the detector as a function of an applied dispersion field and an applied compensation field for each ion channel. The system may thus comprise a drive signal system for applying the dispersion field and the compensation field. It will be appreciated that by using a detector which comprises a separate detecting element for each ion channel that such an output may be more easily generated but the processor may be configured to generate the output from a different style of detector.

It will be appreciated that the ion filter described above can also be used to filter ions. Thus, we also describe a method of filtering ions from a target chemical in a gas sample, the method comprising: passing the gas sample through a first ion channel for filtering ions from a target chemical in the gas sample; passing the gas sample through a second ion channel for filtering ions from the target chemical in the gas sample, wherein the second ion channel is separated from the first ion channel and has a different ion channel gap width to that of the first ion channel.

The gas sample may be passed through the first and second ion channels simultaneously. Alternatively, the gas sample may be passed through the first and second ion channels sequentially. The method may also incorporate the features described above in relation to the ion filter.

We also describe a method of detecting ions from a target chemical in a gas sample, the method comprising: ionizing the gas sample to create ions of the target chemical; filtering the ions as described above; and detecting the ions that output from the filter using a detector. The method may also incorporate the features described above in relation to the system.

BRIEF DESCRIPTION OF THE DRAWINGS

For a better understanding of the invention, and to show how embodiments of the same may be carried into effect, reference will now be made, by way of example only, to the accompanying diagrammatic drawings in which:

FIG. 1b is a schematic illustration of a channel within an ion filter in the system of FIG. 1a;

FIG. 1c is an alternative schematic illustration of the spectrometry system of FIG. 1a;

FIGS. 2a and 2b show a plan view and a cross-section of a first ion filter which may be used in the system of FIG. 1a;

DETAILED DESCRIPTION OF THE DRAWINGS

Figure 1A:
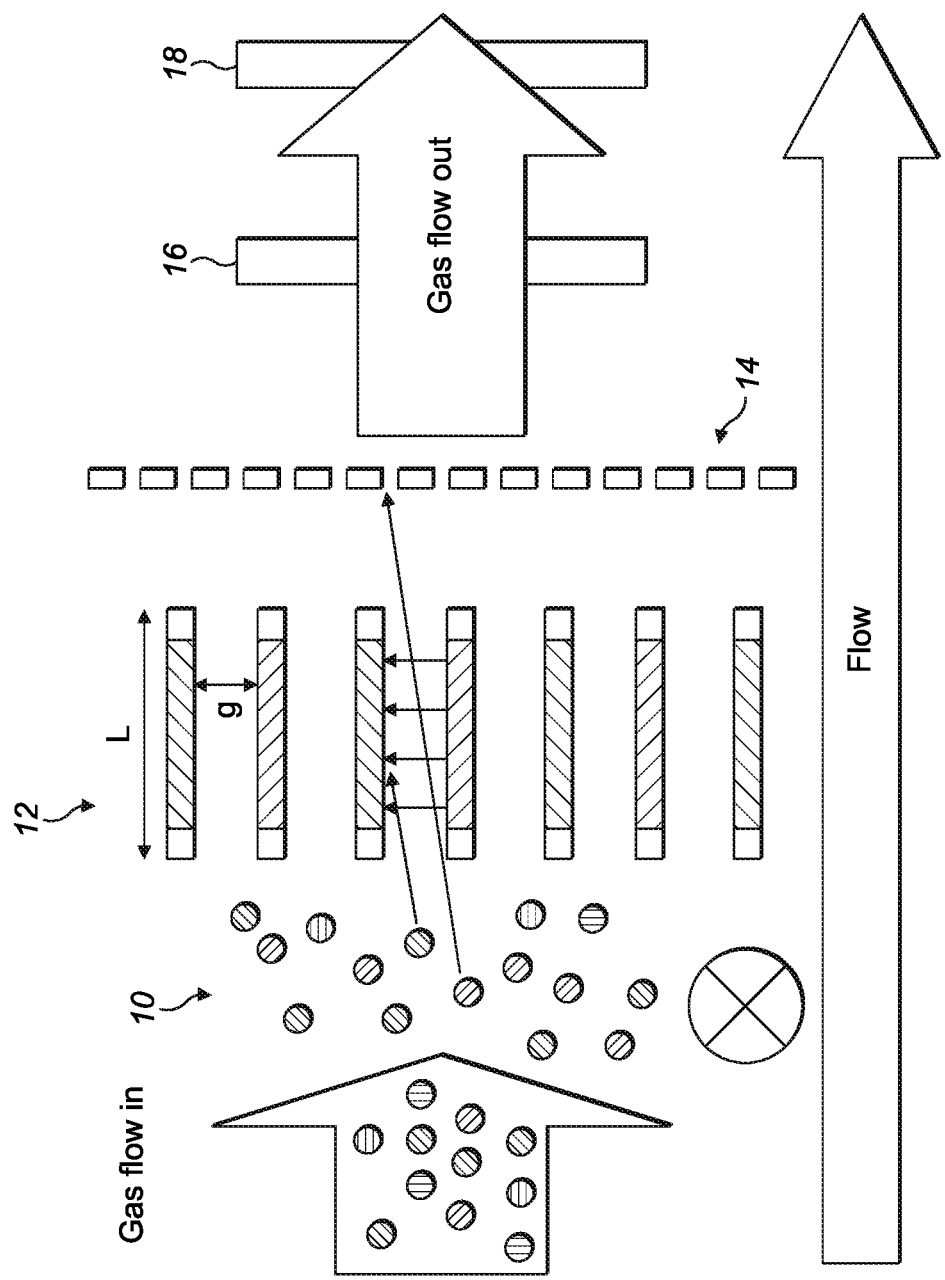
FIG. 1a is a schematic illustration of a spectrometry system.

FIGS. 1a to 1d shows a schematic illustration of a spectrometry system which may be a miniature device as described in "Characterisation of a miniature, ultra-high field, ion mobility spectrometer" by Wilks et al published in Int. J. Ion Mobil Spec. (2012) 15:199-222. As shown in FIG. 1a, gas flows into an ionizer 10 and the generated ions then pass through an ion filter 12. The ion filter separates the ions and may thus be termed an ion separator. In the illustrated example, the ion filter has a plurality of ion channels each having a small gap width (g of around 30 to 50 μm) and relatively short length (e.g. L around 300 μm). The gap surfaces are made of high-conductivity silicon (or similar material) and are electrically connected via wire bonding to metal pads on the face of the silicon. Ions exiting from the ion separator are detected by an ion detector 14. It is known that temperature and pressure can affect the results and thus a temperature sensor 16 and/or a pressure sensor 18 may also be included in the system. These are shown schematically on the output gas flow but could be incorporated into another appropriate location within the device.

Figure 1B:
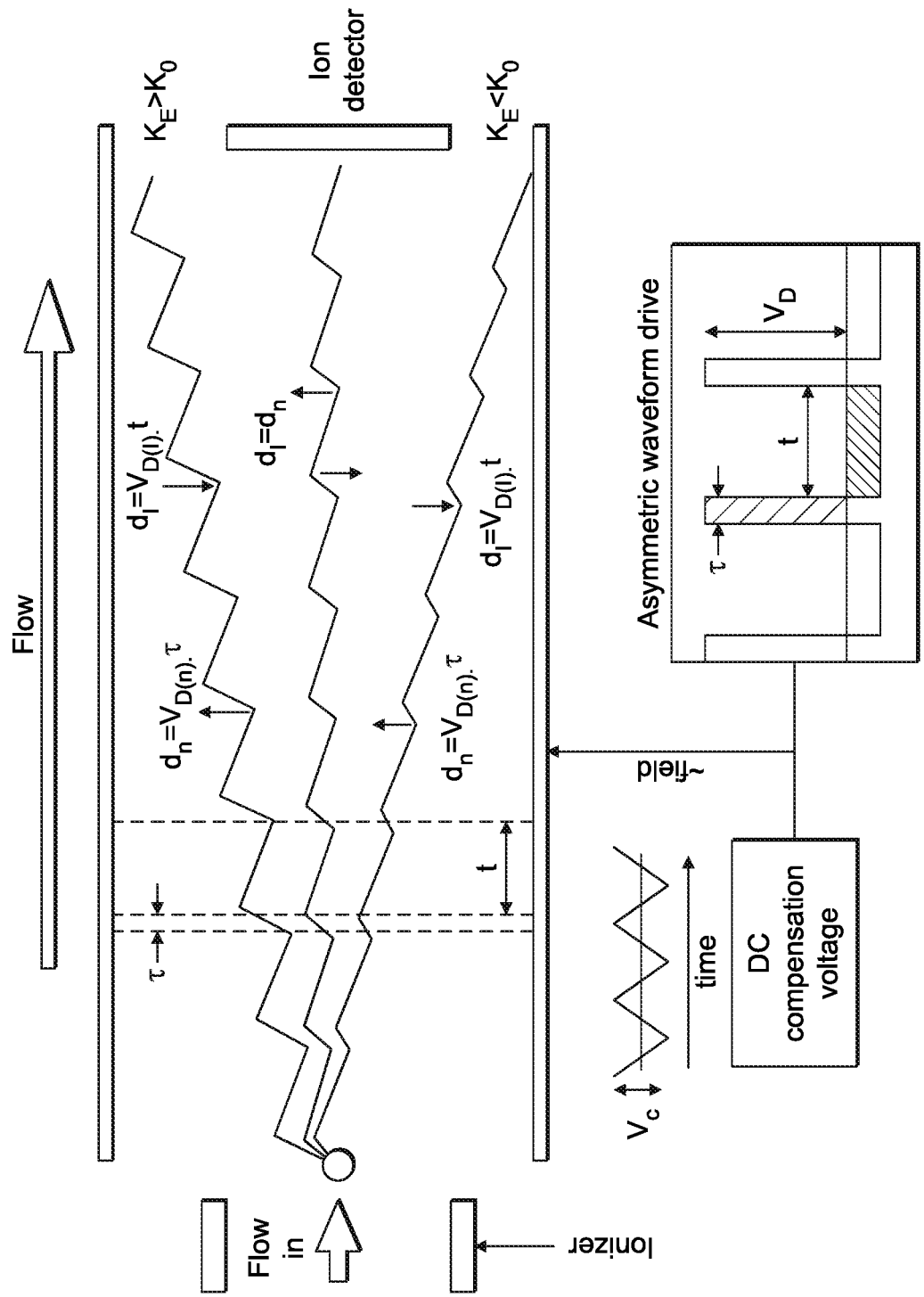

As shown in FIG. 1b, an oscillating electric field is applied to the ion separator. A variable high-voltage asymmetric waveform of low voltage pulse duration t(s) and high voltage pulse duration z(s) and peak voltage $V_D$ is applied to create the variable field of $V_D/g$ (kVcm$^{-1}$). The mobility of each ion within the ion separator oscillates between a low-field mobility $K_0$ and a high-field mobility $K_E$ and the difference between the high-field mobility and low field mobility is termed ΔK. Ions of different chemicals will have different values of ΔK and the ions adopt a net longitudinal drift path length ($d_h$-$d_t$) through the ion filter which is determined by their high and low field drift velocity ($v_{D(h)}$ and $v_{D(l)}$ and the high field and low field pulse durations. Only ions in a "balanced" condition such as the middle ion in FIG. 1b will exit from the ion separator and be detected by the ion detector. Ions which contact either of the sides of the ion channel will not be detected. A bias DC "tuning voltage" ($V_c$) is applied on top of the applied waveform to enable subtle adjustment of the peak voltage $V_D$ to counter the drift experienced by an ion of a specific ΔK.

Figure 1C:
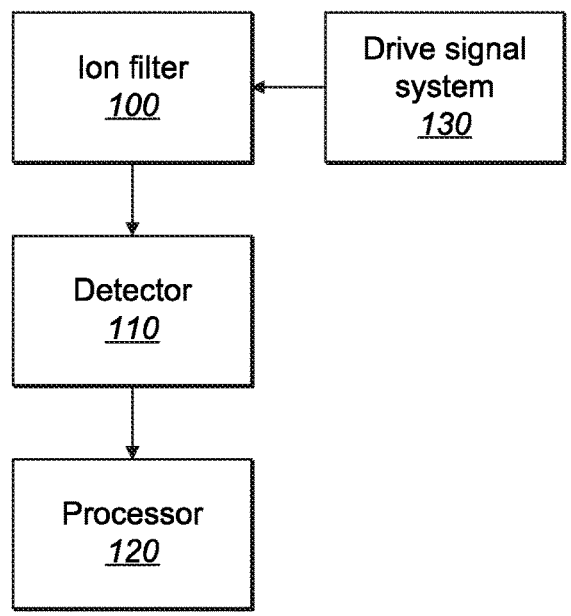
Figure 1D:
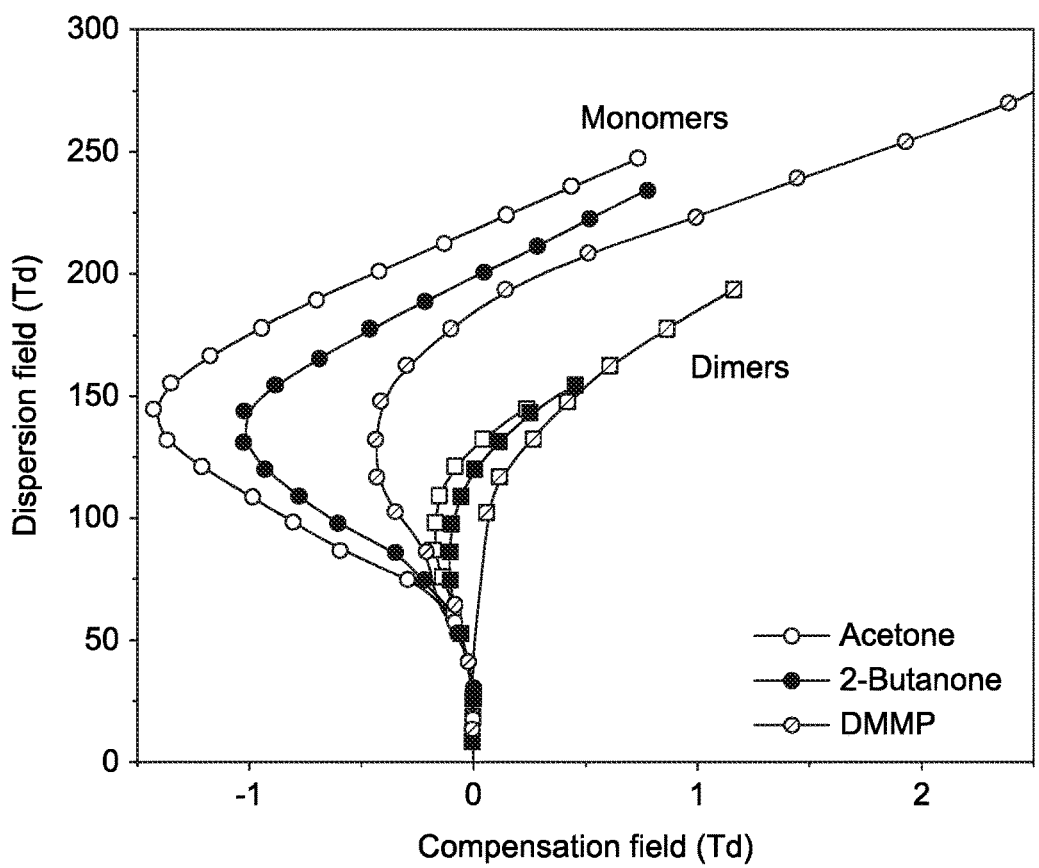
FIG. 1d is an example of the output from the system of FIG. 1c.

As shown schematically in FIG. 1c, a drive signal system 130 applies the asymmetric waveform and the tuning voltage to the ion filter 100 as described above. The output ions from the ion filter 100 are detected by the detector 110. The output from the detector 110 is sent to a processor 120 which may be local (i.e. within the ion filter) or remote (i.e. in a separate computer/server). The processor is adapted to extract numerical parameters which facilitate chemical detection, identification, classification and/or quantification of the ions. For example, the processor may be configured to generate an output as shown in FIG. 1d in which the measurement of ion current at the detector is plotted as a function of the applied electric field resulting from the asymmetric waveform which is known as the dispersion field $E_D$ (kVcm$^{-1}$) and the applied electric field resulting from the DC voltage which is known as the compensation field $E_C$ (kVcm$^{-1}$). The spectral output may alternatively be presented as an m×n matrix of ion current measurements at m compensation field and n dispersion field settings.

FIG. 1d shows the $E_C$:$E_D$ peak trajectories for monomer and dimers of acetone, 2-butanone and dimethyl methyl phosphonate (DMMP). These trajectories are used to identify whether ions of a particular chemical are present in a gas sample by comparing the resulting graph with previously collected graphs of known chemicals generated under the same conditions. However, as illustrated in FIG. 1d, the graphs for some chemicals are similar and thus identification is more difficult when the differences are less pronounced.

As explained in the background section, temperature is a factor which affects the output from the filter. At higher electric fields (such as those used in FAIMS), ions acquire substantial energy from the field and the frequency and strength of the ion-neutral interaction changes. As a result the mobility coefficient $K_E$ at fixed bulk gas temperature becomes dependent on the electric field as shown:

$$K_E = K_0\{1 + \alpha(E_D)\}$$

Where $K_0$ is the mobility coefficient under low field conditions, $\alpha(E)$ is a non-dimensional function characterising the field mobility dependence (called the alpha function) and $E_D$ is the dispersion field. Temperature affects the ion mobility in two ways, namely by changing gas density, N. In addition, gas temperature changes the ion and neutral kinetic energy distributions and hence changes the distribution of ion-neutral collision energies and the ion mobility. The effective temperature of an ion $T_{eff}$ may be defined as:

$$T_{eff} = T + \frac{\zeta M K_0^2 N_0^2 \left(\frac{E_D}{N}\right)^2}{3k_b}$$

where T is the neutral gas temperature (i.e. the temperature in the absence of an electric field), $\zeta$ is the ion-neutral collision efficiency factor, M is the molecular weight of the drift gas, $K_0$ is the mobility coefficient under low field conditions, $N_0$ is the standard gas density, $E_D/N$ is the dispersion field in Townsend, N is the gas density and $k_b$ is Boltzmann's gas constant.

Figure 2A:
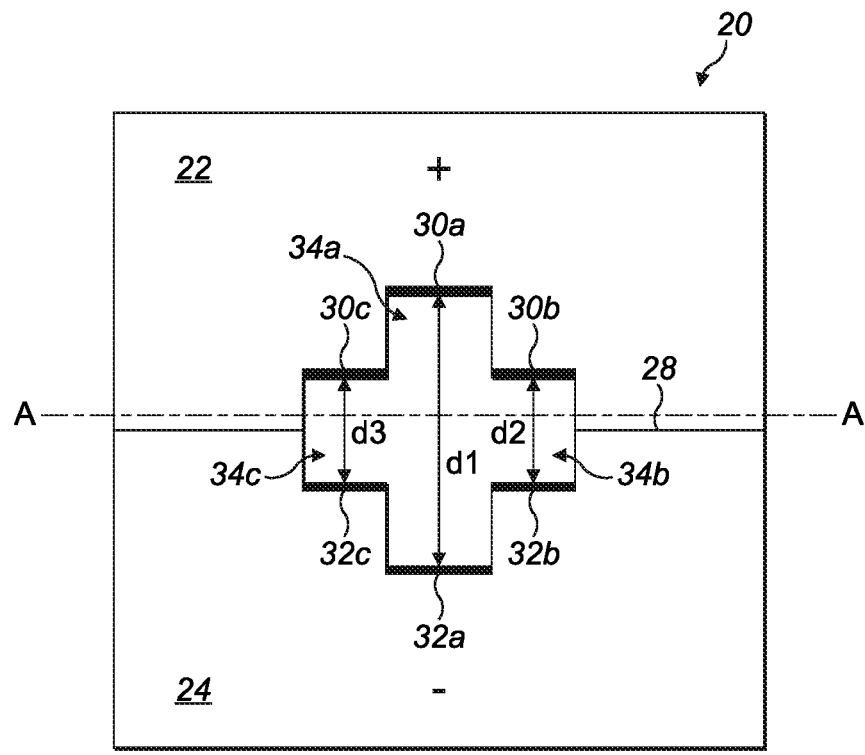
Figure 2B:
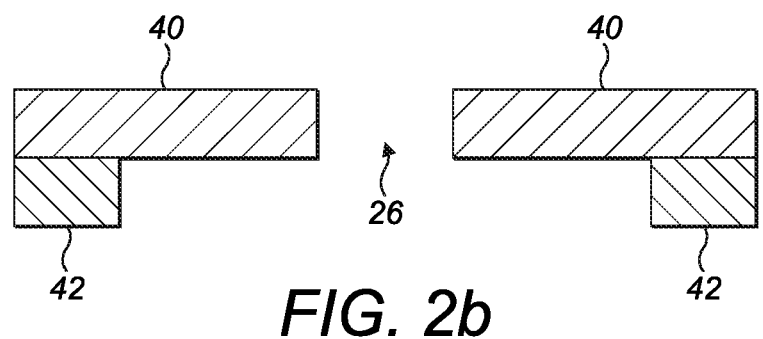

FIGS. 2a and 2b show a first ion filter 20 which could be used in the system shown in FIG. 1a. The ion filter 20 comprises a monolithic electrode layer 40 which comprises a first electrode portion 22 and a second electrode portion 24 which are separated by an aperture 26. As shown more clearly in FIG. 2b, the aperture 26 passes through the monolithic electrode layer 40 and in use, channels the flow of ions through the ion filter. The monolithic electrode layer 40 is supported on an annular, frame shaped support layer 42. Either side of the aperture 26, there are portions 28 of insulating material (e.g. silicon) which electrically isolate the first and second electrode portions from one another. Two opposing faces of the aperture 26 (highlighted in bold) are thus defined by the first and second electrode portions respectively and are thus coated with electrically conducting material (e.g. gold) The other two opposing faces of the aperture are insulating.

The monolithic electrode layer comprises a plurality of electrodes 30a, 30b, 30c, 32a, 32b, 32c. The electrodes are divided into an array of first electrodes 30a, 30b, 30c in the first electrode portion 22 and an array of second electrodes 32a, 32b, 32c in the second electrode portion 24. Each first electrode may be positive and each second electrode may be negative or vice versa. Thus, as shown the electrodes are parts of the surfaces of the first and second electrode portions but may be defined as separate electrodes in this context.

The aperture 26 comprises an array of three ion channels 34a, 34b, 34c which are in direct contact with one another, i.e. they are not separated from each other by electrodes. As with the electrodes, the ion channels form part of the aperture but may be considered to be separate ion channels in this context. A first ion channel 34a defines a gap between a first pair of opposed electrodes 30a, 32a and has a first ion channel gap width D. Similarly, the second ion channel 34b defines a gap between a second pair of opposed electrodes 30b, 32b and has a second ion channel gap width d. The third ion channel 34c defines a gap between a third pair of opposed electrodes 30c, 32c and has a third ion channel gap width d. In other words, each ion channel defines a gap between a respective pair of electrodes in the plurality of electrodes. Furthermore, each ion channel gap width is the distance between the opposed pairs of electrodes. In this arrangement, the first ion gap width D is greater than the second and third ion gap widths which are both equal to d. It will be appreciated that other gap widths can be used but in general each ion channel is preferred to have a different ion gap width to each ion channel which is adjacent to it.

The use of ion channels having different widths provides greater sensitivity. As explained above, in a FAIMS system, a bias DC "tuning voltage" ($V_c$) is applied on top of the applied waveform to enable subtle adjustment of the peak voltage $V_D$ to counter the drift experienced by an ion of a specific $\Delta K$. By using channels having different widths, it is possible to select a tuning voltage whereby predominantly only ions of the target chemicals are able to travel along the ion channels of different widths without hitting one or other of the electrodes on either side of the ion channel.

Figure 3A:
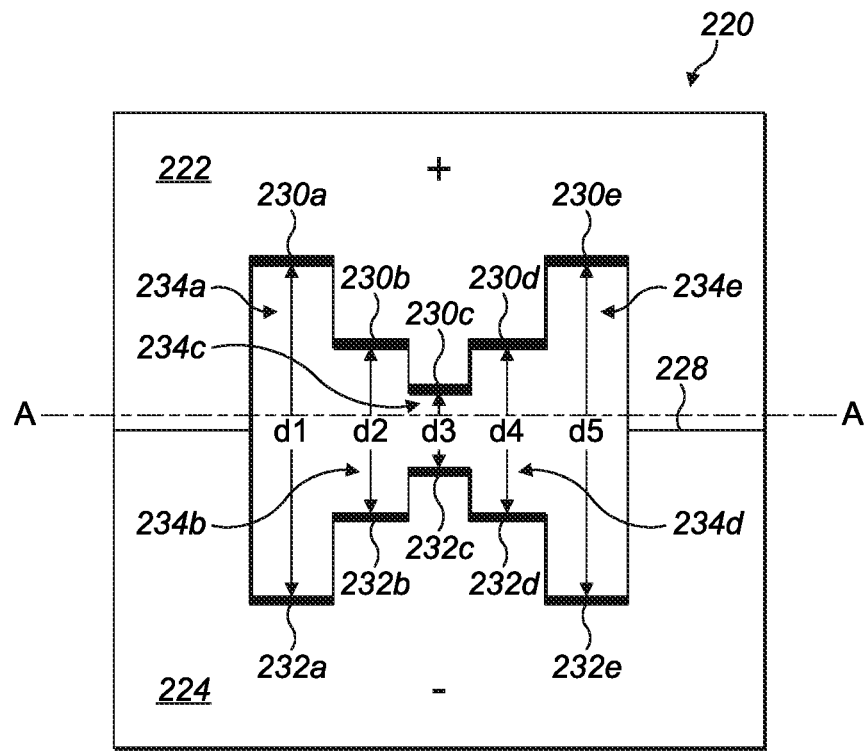
FIGS. 3a and 3b show a plan view and a cross-section of a second ion filter.
Figure 3B:
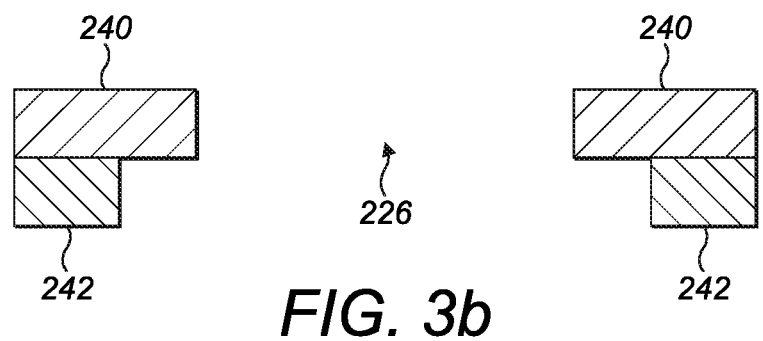

FIGS. 3a and 3b show a second ion filter 220 which could be used in the system shown in FIG. 1a. It has some features in common with the ion filter shown in FIG. 2a. As in the previous arrangement, the ion filter 220 comprises a monolithic electrode layer 240 which comprises a first electrode portion 222 and a second electrode portion 224 which are separated by an aperture 226. The monolithic electrode layer 240 is supported on an annular support layer 242. On both sides of the aperture 226, there are portions 228 of insulating material and the pattern of conductive and non-conductive faces of the aperture is the same as in FIG. 2a.

In this case, the monolithic electrode layer comprises a plurality of electrodes 230a to 230e and 232a to 232e which are divided into first and second arrays as in FIG. 2a. The aperture 226 comprises an array of five ion channels 234a to 234e which are in direct contact with one another. A first ion channel 234a defines a gap between a first pair of opposed electrodes 230a, 232a and has a first ion channel gap width $d_1$. Similarly, each of the other ion channels 234b to 234e defines a gap between another pair of opposed electrodes (230b, 232b), (230c, 232c), (230d, 232d) and has a respective ion channel gap width $d_n$. In this arrangement, the first ion gap width $d_1$ is greater than the second and third ion gap widths $d_2$ and $d_3$. The first ion gap width $d_1$ is also greater than the fourth ion gap width $d_4$ which is equal to the second ion gap width $d_2$. The fifth ion gap width $d_5$ is equal to the first ion gap width $d_1$. It will be appreciated that other gap widths can be used but as shown each ion channel is preferred to have a different ion gap width to each ion channel which is adjacent to it. Thus, the first ion channel has a different ion gap width to the second ion channel which is adjacent to it and the second ion channel has a different ion gap width to both the first and third ion channels.

In this arrangement, the ion channel with the smallest ion gap width $d_3$ is located closer to the centre of the ion filter than the other ion channels, all of which have larger ion gap widths. In other words, the gap width of the channels with respect to one another tapers towards the centre of the ion filter. This helps to channel the flow through all the ion channels rather than the flow passing primarily through one of the channels. As explained above, a gas sample would prefer to pass through a wider channel or a channel in the centre of the ion filter. Thus, by locating the narrower channel at the centre, the flow is more evenly distributed through the different ion channels. It will be appreciated that the channels could be arranged in the aperture with the gap widths in the best arrangement to provide a desired pattern of flow.

Figure 4A:
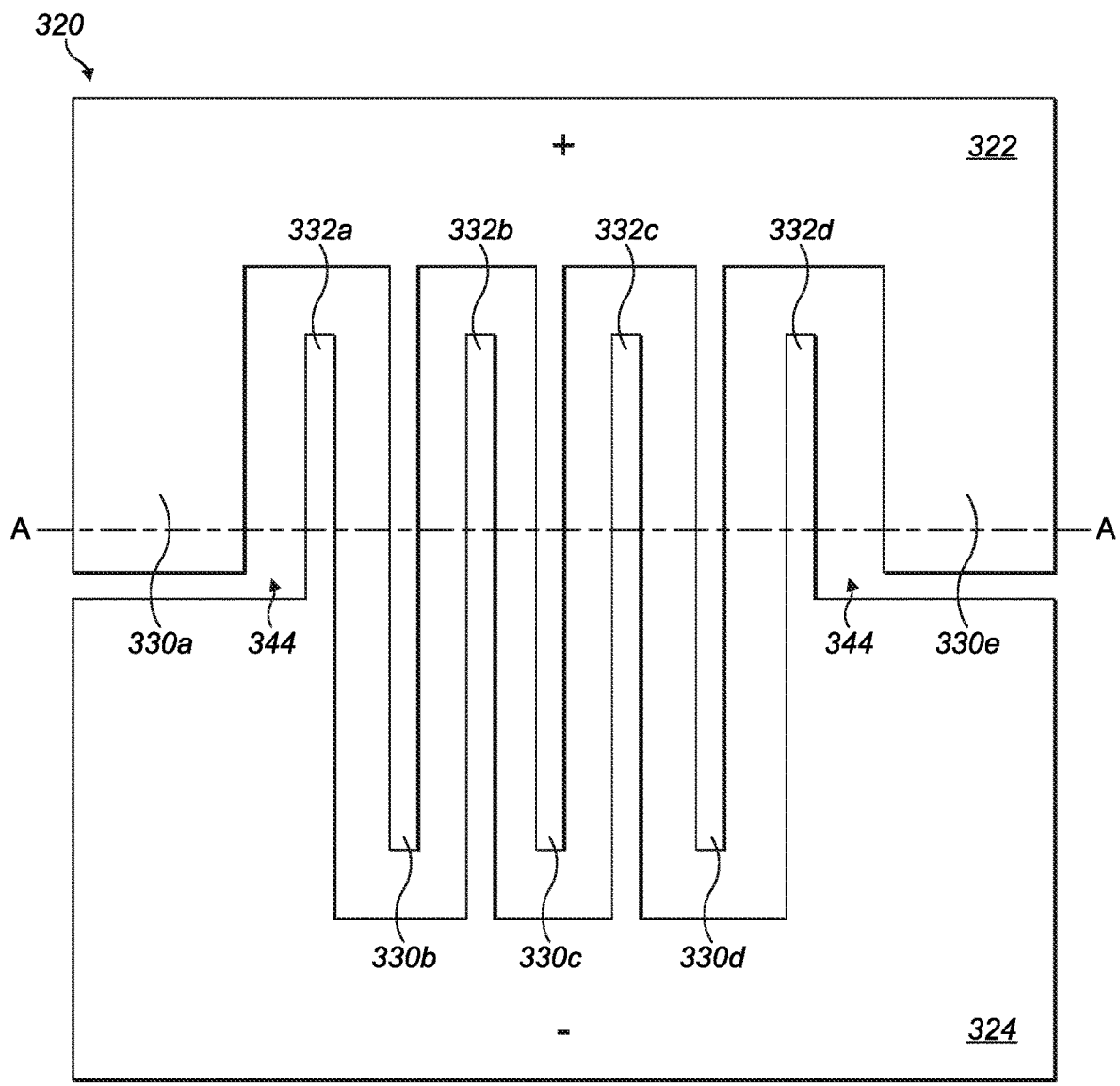
FIGS. 4a and 4b show a plan view and a cross-section of a third ion filter.
Figure 4B:
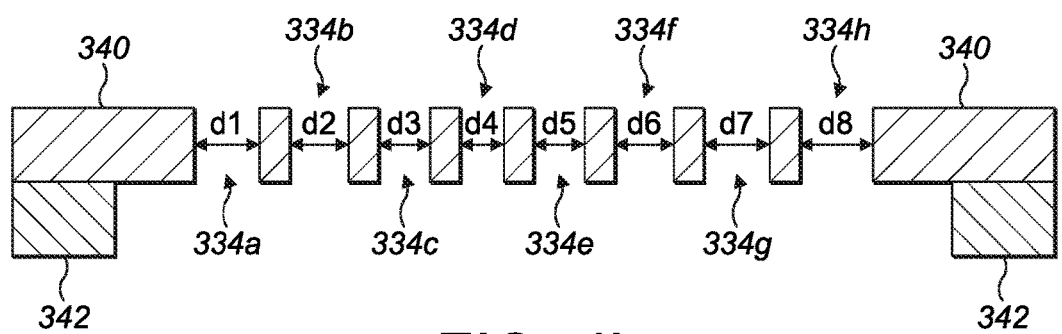

FIGS. 4a and 4b show a third ion filter 320 which could be used in the system shown in FIG. 1a. As in the previous arrangements, the ion filter 320 comprises a monolithic electrode layer 340 which comprises a first electrode portion 322 and a second electrode portion 324. The monolithic electrode layer 340 is supported on an annular support layer 342. In contrast to the arrangements shown in FIGS. 2a and 3a, a continuous channel 344 rather than an aperture divides the electrode layer in to the first and second electrode portions.

The monolithic electrode layer comprises a plurality of electrodes 330a to 330e and 332a to 332d which are divided into first and second arrays, with the first array being in the first electrode portion and the second array being in the second electrode portion. In this arrangement, there are a different number of electrodes in each array. The first and second arrays of electrodes also form an interdigitated array of electrodes.

The continuous channel 344 comprises an array of eight ion channels 334a to 334h. A first ion channel 334a defines a gap between a first pair of opposed electrodes 330a, 332a and has a first ion channel gap width $d_1$. Similarly, each of the other ion channels 334b to 334h defines a gap between another pair of opposed electrodes and as before the width of the gap is the distance between the opposed electrodes. However, the interdigitated arrangement of electrodes means that all the electrodes except those at the edges of the electrode layer are paired twice with two different electrodes to form two different ion channels. Thus, the second ion channel 334b defines a gap $d_2$ between a pair of opposed electrodes 330b, 332a—in other words the first electrode 332a in the second electrode portion is one half of the pair of electrodes for both the first and second ion channels. The other ion channels 334c to 334g define a gap between pairs of opposed electrodes as follows: (330b, 332b), (330c, 332b), (330c, 332c), (330d, 332c), (330d, 332d), (330e, 332d) and each has a respective ion channel gap width $d_n$. In this arrangement, the first ion gap width $d_1$ is equal to the eighth ion gap width $d_8$ which are greater than the other gap widths; $d_4$ being the smallest gap width. The second ion gap width $d_2$ is equal to the seventh ion gap width $d_7$. It will be appreciated that other gap widths can be used but as shown each ion channel is preferred to have a different ion gap width to each ion channel which is adjacent to it. Thus, the first ion channel has a different ion gap width to the second ion channel which is adjacent to it and the second ion channel has a different ion gap width to both the first and third ion channels and so on.

In this arrangement, like in FIG. 3a, the ion channel with the smallest ion gap width $d_4$ is located closer to the centre of the ion filter than the other ion channels, all of which have larger ion gap widths. In other words, the gap width is tapering towards the centre as before. As explained above this helps to channel the flow through more evenly through the ion filter.

Figure 5A:
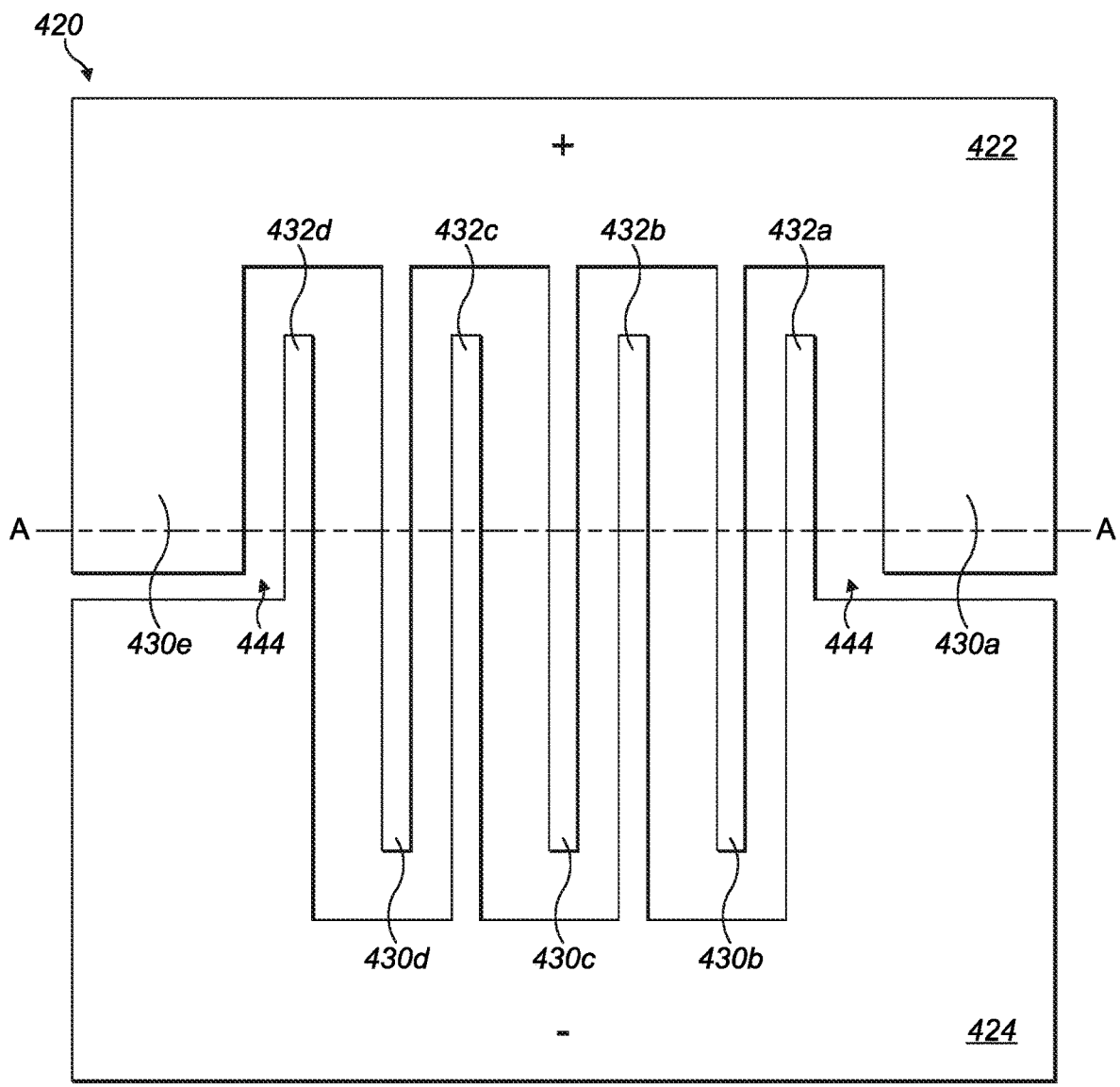
FIGS. 5a and 5b show a plan view and a cross-section of another ion filter.
Figure 5B:
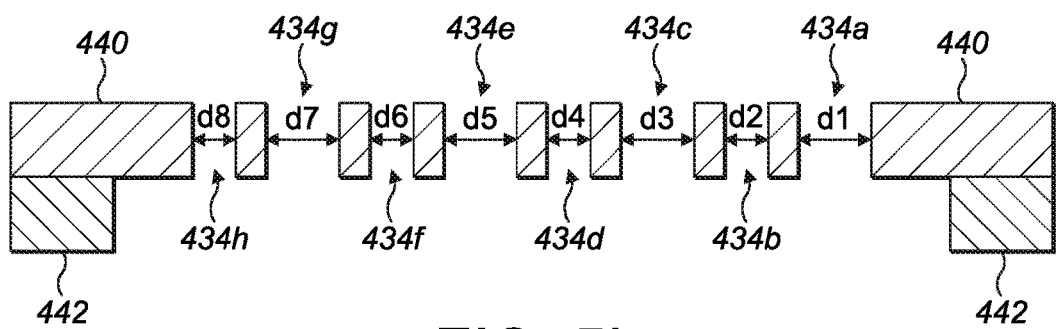

FIGS. 5a and 5b show a fourth ion filter 420 which could be used in the system shown in FIG. 1a. The arrangement is similar to that shown in FIG. 4a and the ion filter 420 comprises a monolithic electrode layer 440 which comprises a first electrode portion 422 and a second electrode portion 424. The monolithic electrode layer 440 is supported on an annular support layer 442. A continuous channel 444 divides the electrode layer in to the first and second electrode portions.

The monolithic electrode layer comprises a plurality of electrodes 430a to 430e and 432a to 432d which are divided into first and second arrays, with the first array being in the first electrode portion and the second array being in the second electrode portion. As before, there are a different number of electrodes in each array. The first and second arrays of electrodes also form an interdigitated array of electrodes. In the arrangement of FIG. 4a, the gap widths are smaller towards the centre of the ion filter and this results in each array of electrodes having uneven spacings between the electrodes. By contrast, as explained in more detail below, in the arrangement of FIG. 5a, the electrodes are evenly spaced in each of the first and second arrays.

The continuous channel 444 comprises an array of eight ion channels 434a to 434h. A first ion channel 434a defines a gap between a first pair of opposed electrodes 430a, 432a and has a first ion channel gap width $d_1$. Similarly, each of the other ion channels 434b to 434h defines a gap between another pair of opposed electrodes with all the electrodes except those at the edges of the electrode layer being paired twice with two different electrodes to form two different ion channels. The other ion channels 434b to 434g define a gap between pairs of opposed electrodes as follows: (430b, 432a) (430b, 432b), (430c, 432b), (430c, 432c), (430d, 432c), (430d, 432d), (430e, 432d) and each has a respective ion channel gap width $d_n$. In this arrangement, each of the first, third, fifth and seventh ion gap widths $d_1$ $d_3$ $d_5$ $d_7$ are equal to one another and each of the second, fourth, sixth and eighth ion gap widths $d_2$ $d_4$ $d_6$ $d_8$ are equal to one another and are smaller than the odd gap widths. In this way, adjacent channels have different gap widths but by alternating equal sized gap widths, the spacings between electrodes in the array are equal and thus two regular spaced arrays are effectively just staggered relatively to one another.

Figure 6A:
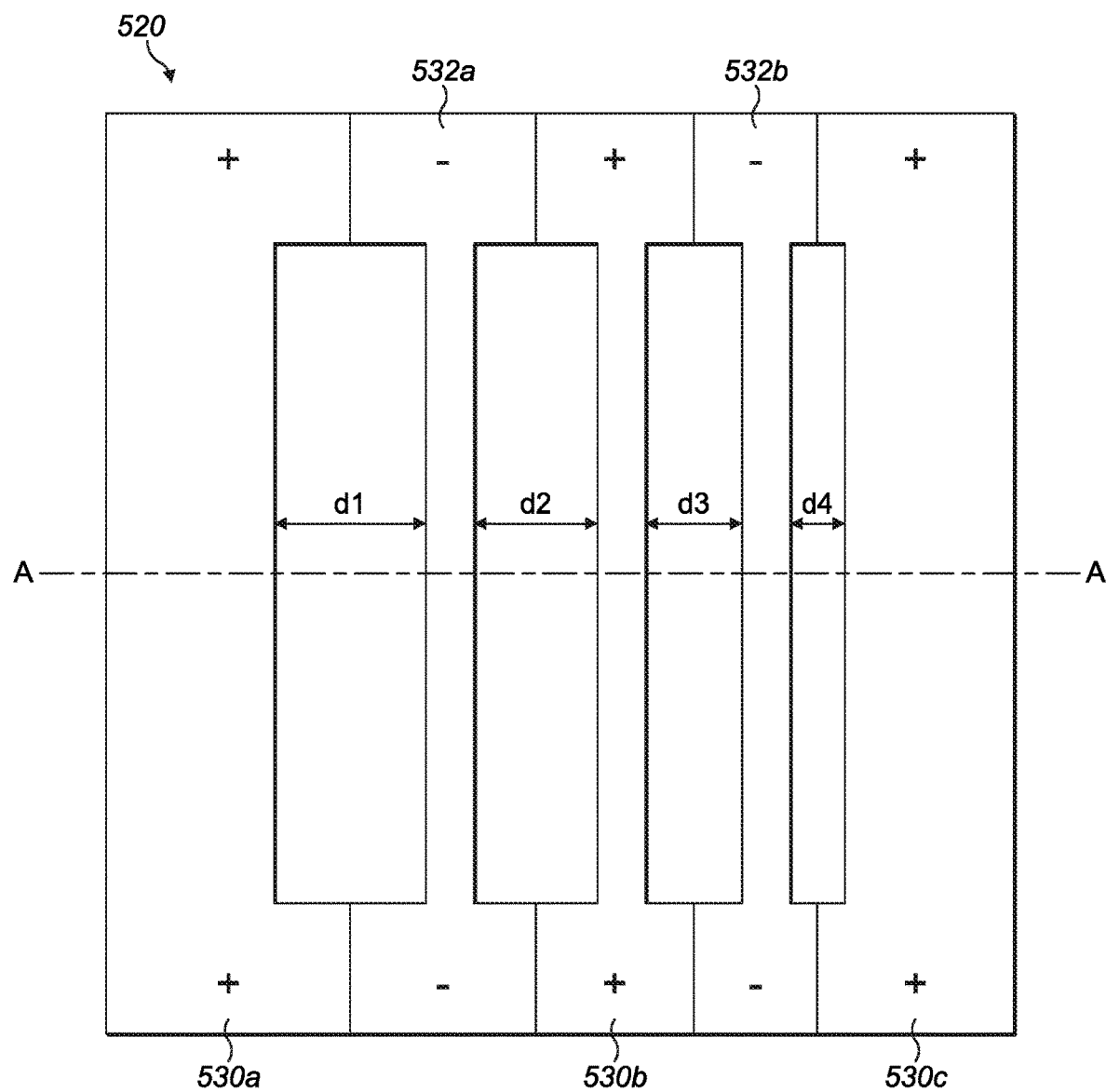
FIGS. 6a and 6b show a plan view and a cross-section of another ion filter.
Figure 6B:
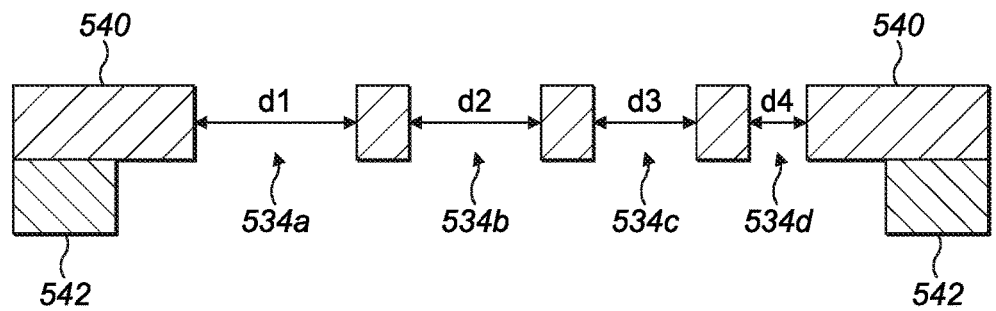

FIGS. 6a and 6b show a fifth ion filter 520 which could be used in the system shown in FIG. 1a. The arrangement is similar to that shown in FIGS. 2a, 3a, 4a and 5a because the ion filter 520 comprises a monolithic electrode layer 540 supported on an annular support layer 542. However, there is no separate first and second electrode portion.

The monolithic electrode layer comprises a plurality of electrodes 530a to 530c and 532a to 532b which are divided into first and second arrays. As before, there are a different number of electrodes in each array. Although there is no first and second electrode portion, as before, the electrodes in the first array are positive and the electrodes in the second array are negative (or vice versa). The array of electrodes alternates electrodes in the first array with electrodes in the second array and thus insulating material is positioned between each pair of adjoining electrodes to isolate any contacting surfaces.

The electrode layer also comprises an array of four ion channels 534a to 534d. A first ion channel 534a defines a gap between a first pair of opposed electrodes 530a, 532a and has a first ion channel gap width $d_1$. Similarly, each of the other ion channels 534b to 534d defines a gap between another pair of opposed electrodes with all the electrodes except those at the edges of the electrode layer being paired twice with two different electrodes to form two different ion channels. The gap width is the distance between the opposed electrodes. The other ion channels 534b to 534d define a gap between pairs of opposed electrodes as follows: (530b, 532a) (530b, 532b), (530c, 532b) and each has a respective ion channel gap width $d_n$. In this arrangement, the first gap width is larger than the second gap width $d_2$ which is larger than the third gap width $d_3$. The fourth gap width $d_4$ is the smallest. Thus, the gap width decreases (i.e. tapers) from one side of the ion filter to the other. It will be appreciated that four ion channels is merely indicative and more or fewer ion channels can be incorporated. It will also be appreciated that the ion channels could be arranged with the narrowest ion channel towards the centre of the ion filter to gain the benefit described above or in any other arrangement, although as noted before, it is preferred but not essential that neighbouring channels have different gap widths.

Figure 7A:
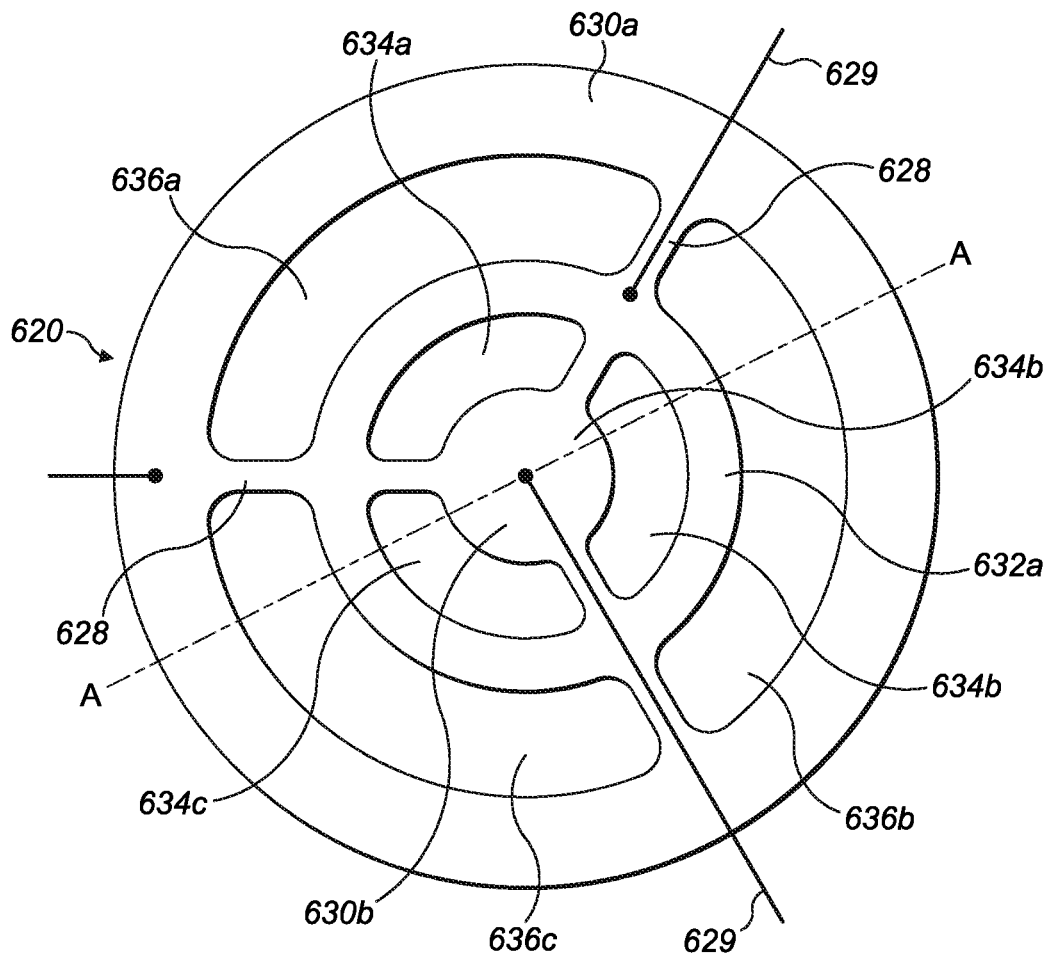
FIGS. 7a and 7b show a plan view and a cross-section of another ion filter.
Figure 7B:
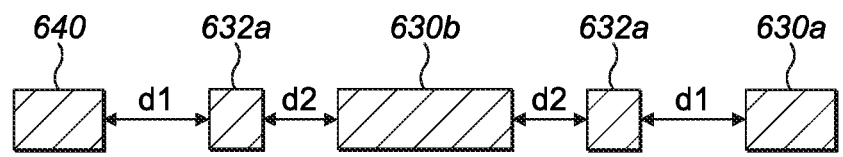

FIGS. 7a and 7b show a sixth ion filter 620 which could be used in the system shown in FIG. 1a. In each of the arrangements shown in FIGS. 2a, 3a, 4a and 5a, the geometry is generally rectangular or square but in FIG. 7a, the ion filter is circular. It will be appreciated that the previous arrangements could be adapted to be circular. In FIG. 7a, the ion filter 620 comprises a substrate layer 640 on to which electrodes are patterned as described below. Accordingly, unlike the other embodiments, there is no monolithic electrode layer and annular support. The substrate layer is made from an insulating material (e.g. silicon) and the electrodes may be patterned from a conductive metal (e.g. gold).

There is a plurality of electrodes 630a, 630b and 632a which are divided into first and second arrays. As before, there are a different number of electrodes in each array. Although there is no first and second electrode portion, as before, the electrodes in the first array are positive and the electrodes in the second array are negative (or vice versa). In this arrangement, the electrodes are annular and are concentrically patterned with the electrodes in the first array alternating with the electrodes in the second array. Insulating material 628 is positioned between each electrode to isolate any contacting surfaces. Electrical connections 629 (e.g. wires) are patterned on the opposed surface of the substrate to the electrodes. Holes through the substrate allow each electrical connection to be connected to the respective electrode.

The electrode layer also comprises an array of six ion channels 634a to 634c, 636a to 636c. There is a first set of three ion channels 636a to 636c in which each ion channel defines a gap between a first pair of opposed electrodes 630a, 632a and has a first ion channel gap width $d_1$. In a second set of three ion channels 634a to 634c, each ion channel defines a gap between a second pair of opposed electrodes 630b, 632a and has a second ion channel gap width $d_2$. The gap width is the distance between the opposed electrodes. In this arrangement, the first gap width is larger than the second gap width $d_2$.

The first set of three ion channels effectively forms a first discontinuous channel between the outermost electrode 630a and its neighbouring electrode 632a. Similarly, the second set of three ion channels forms a second discontinuous channel between the innermost electrode 630b and its neighbouring electrode 632a. Each discontinuous channel comprises insulating material 628 between neighbouring ion channels. In the arrangement shown, the discontinuous channels are concentrically arranged with respect to each other. It will be appreciated that each discontinuous channel may comprise a different number of ion channels and that there may be more than three electrodes in the array. The circular geometry means that each ion channel has opposed curved surfaces. The radius of curvature for each ion channel surface is selected so that the surfaces are parallel and a constant ion channel gap width is maintained throughout the ion channel.

Figure 8A:
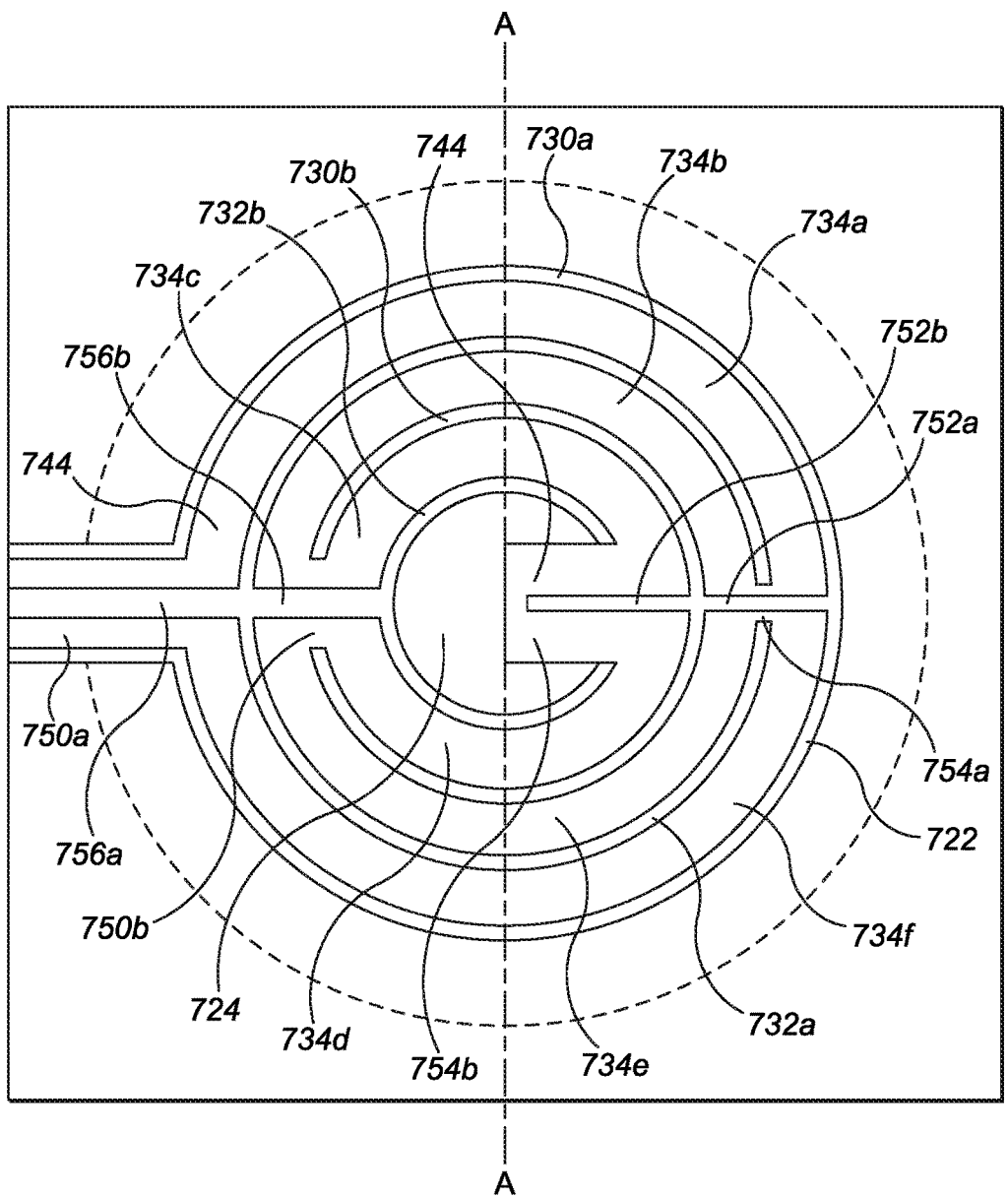
FIGS. 8a and 8b show a plan view and a cross-section of another ion filter.
Figure 8B:
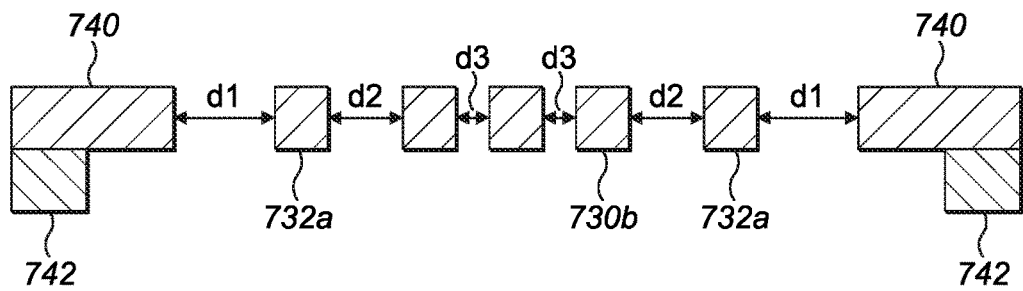

FIGS. 8a and 8b show a seventh ion filter 720 which could be used in the system shown in FIG. 1a. The arrangement is similar to that shown in FIGS. 4a and 5a and the ion filter 720 comprises a monolithic electrode layer 740 which comprises a first electrode portion 722 and a second electrode portion 724. The monolithic electrode layer 740 is supported on an annular support layer 742. A continuous channel 744 divides the electrode layer in to the first and second electrode portions. In contrast to the arrangements of FIGS. 4a and 5a, the continuous channel 744 is curved whereby although the overall outline of the filter is rectangular, the interdigitated electrodes are curved as explained below. As in FIG. 6a, the circular geometry means that each ion channel has opposed curved surfaces. The radius of curvature for each ion channel surface is the same so that a constant ion channel gap width is maintained throughout the ion channel.

The monolithic electrode layer comprises a plurality of electrodes 730a, 730b and 732a to 732b which are divided into first and second arrays, with the first array being in the first electrode portion and the second array being in the second electrode portion. The first electrode 730a and the second electrode 730b are generally circular in cross-section with the second electrode 730b concentrically mounted within the first electrode 730a. Both electrodes have a cross-section in the form of a discontinuous annular ring and thus form a partial hollow cylinder. Each electrode has a spacing 750a, 750b which is aligned with the spacing 750a, 750b in the other electrode and a protrusion 752a, 752b extending from the opposed portion of the circle to the spacing. The protrusion on the first electrode 730a forms a connecting portion which connects the two electrodes together. The first electrode 732a and the second electrode 732b in the second array are also generally cylindrical with the second electrode 732b concentrically mounted within the first electrode 732a. The first electrode 732a has the cross-section of a discontinuous annular ring and the second electrode 732b has a generally circular cross-section. Both electrodes have a spacing 754a, 754b which is aligned with the spacing 754a, 754b in the other electrode of the second array and a protrusion 756a, 756b extending from the opposed portion of the circle to the spacing. The protrusion 756a of the first electrode 732a of the second array extends through the spacing 750a in the first electrode 730a of the first array and the protrusion 756b of the second electrode 732b of the second array extends through the spacing 750b in the second electrode 730b in the first array. Similarly, the protrusion 752a of the first electrode 730a of the first array extends through the spacing 754a in the first electrode 732a of the second array and the protrusion 752b of the second electrode 730b of the first array extends through the spacing 754b in the second electrode 732b in the second array. The first electrode 732a of the second array is between the first and second electrodes in the first array and the second electrode 732b of the second array is concentrically located within the second electrode of the first array. In this way, the first and second arrays of electrodes also form an interdigitated array of electrodes which in this arrangement have a circular geometry.

The continuous channel 744 comprises an array of seven ion channels 734a to 734g. A first ion channel 734a defines a gap between a first pair of opposed electrodes 730a, 732a and has a first ion channel gap width $d_1$. A second ion channel 734b defines a gap between a second pair of opposed electrodes 730b, 732a and has a second ion channel gap width $d_2$. A third ion channel 734c defines a gap between a third pair of opposed electrodes 730b, 732b and has a third ion channel gap width $d_3$. Each of the first to third ion channels has a cross-section of an arc. The fourth to six ion channels mirror the shape of the first to third ion channels on the other side of the ion filter. The other ion channels 734d to 434f define a gap between pairs of opposed electrodes as follows: (730b, 732b) (730b, 732a), (730a, 732a) and each has a respective ion channel gap width $d_n$. In this arrangement, each of the first and sixth ion gap widths $d_1$ $d_6$, the second and fifth ion gap widths $d_2$ $d_5$ and the third and fourth ion gap widths $d_3$ $d_4$ are equal to one another. In this way, adjacent channels have different gap widths. Moreover, the first ion channel width $d_1$ is greater than the second ion channel width $d_2$ which is greater than the third ion channel width $d_3$ so that the ion channel width decreases towards the centre of the ion filter to provide the advantage described above.

Figure 9:
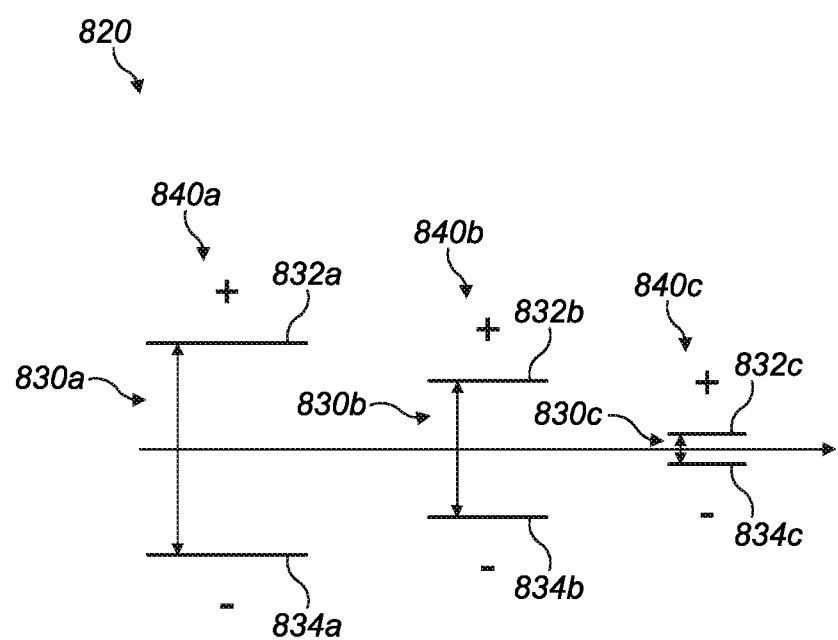
FIG. 9 is a plan view of another filter.

FIG. 9 shows a schematic illustration of an alternative ion filter 820 in which there are multiple electrode layers rather than a monolithic electrode layer. Each electrode layer is separated by an insulating layer (not shown) as is conventionally known in the art. In this arrangement, there are three electrode layers 840a, 840b, 840c but it will be appreciated that another number of layers may be used depending on the system into which the ion filter is to be fitted.

A first electrode layer 840a comprises a pair of electrodes 832a, 834a with an ion channel 830a defining a gap having a first gap width $d_1$ between the pair of electrodes. Similarly, a second electrode layer 840b comprises a pair of electrodes 832b, 834b with an ion channel 830b defining a gap having a second gap width $d_2$ between the pair of electrodes. A third electrode layer 840c comprises a pair of electrodes 832c, 834c with an ion channel 830c defining a gap having a third gap width $d_3$ between the pair of electrodes.

There are thus a plurality of electrodes which may be divided into a first array (832a, 832b, 832c) and a second array (834a, 834b, 834c). The first array comprises positive electrodes and the second array comprises negative electrodes (or vice versa) Each of the three ion channels 830a, 830b, 830c form part of a continuous channel through which ions flow in the direction of the arrow. In this arrangement, the ions flow through the channels in series (i.e. sequentially) rather than in parallel as shown in the other arrangements. The first ion channel gap width $d_1$ is greater than the second ion channel gap width $d_2$ which is itself greater than the third ion channel gap width $d_3$. Thus, each neighbouring ion channel has a different ion gap width and the continuous channel gradually decreases in width (or tapers) with the direction ion flow.

Although a few preferred embodiments of the present invention have been shown and described, it will be appreciated by those skilled in the art that various changes and modifications might be made without departing from the scope of the invention, as defined in the appended claims.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An ion filter for filtering ions in a gas sample, the ion filter comprising:
   a plurality of electrodes;
   a first ion channel for filtering ions from a target chemical in the gas sample, wherein the first ion channel defines a gap between a first pair of electrodes in the plurality of electrodes and has a first ion channel gap width;
   a second ion channel for filtering ions from the target chemical in the gas sample, wherein the second ion channel defines a gap between a second pair of electrodes in the plurality of electrodes and has a second ion channel gap width; and
   a monolithic electrode layer,
   wherein each ion channel and each of the plurality of electrodes are located within the monolithic electrode layer, and
   wherein the first ion channel gap width is greater than the second ion channel gap width.

2. The ion filter of claim 1, further comprising an array of ion channels having at least three ion channels, wherein each ion channel in the array defines a gap between a respective pair of electrodes in the plurality of electrodes and has a respective ion channel gap width.

3. The ion filter of claim 2, wherein each ion channel in the array of ion channels has a different ion channel gap width to each neighboring ion channel.

4. The ion filter of claim 2, wherein the ion channel having the shortest ion gap width is located closer to the center of the ion filter than each ion channel having a larger ion gap width.

5. The ion filter of claim 1, wherein the electrode layer comprises a first electrode portion and a second electrode portion and wherein each of the pairs of electrodes comprise a first electrode located within the first electrode portion and a second electrode located within the second electrode portion.

6. The ion filter of claim 5, wherein the plurality of electrodes comprises a first and a second array of electrodes and wherein the first electrode portion comprises the first array and the second electrode portion comprises the second array.

7. The ion filter of claim 6, wherein the ion channels form part of a continuous channel which divides the electrode layer into first and second electrode portions.

8. The ion filter of claim 7, wherein the first and second arrays of electrodes form an interdigitated array of electrodes.

9. The ion filter of claim 8, wherein each electrode in the first array is evenly spaced from its neighboring electrodes within the first array and each electrode in the second array is evenly spaced from its neighboring electrodes within the second array and each neighboring ion channel in the interdigitated array has a different ion gap width.

10. The ion filter of claim 8, wherein the respective gap width of each ion channel relative to the gap width of the other ion channels tapers in width towards the center of the interdigitated array.

11. The ion filter of claim 8, wherein each of the plurality of electrodes is at least partially curved.

12. The ion filter of claim 11, wherein at least some of the plurality of electrodes are in the form of a partial hollow cylinder.

13. The ion filter of claim 1, wherein the first and second ion channels are in direct contact with each other thereby defining an aperture between the first and second electrode portions.

14. The ion filter of claim 13 comprising insulating material between the first and second electrode portions on either side of the aperture.

15. The ion filter of claim 1, further comprising a first array of positive electrodes and a second array of negative electrodes wherein each of the pairs of electrodes comprise a first electrode located with the first array and a second electrode located within the second array.

16. An ion mobility spectrometry system, comprising:
an ion filter as set out in claim 1;
an ionizer for generating ions within the gas sample; and
a detector for detecting an output from the ion filter.

17. The ion mobility spectrometry system of claim 16 wherein the detector comprises a separate detecting element for each ion channel.

18. The ion mobility spectrometry system of claim 16, further comprising a processor configured to generate a graphical output for each ion channel.

19. The ion mobility spectrometry system of claim 18, wherein the processor is configured to generate a measurement of ion current at the detector as a function of an applied dispersion field and an applied compensation field for each ion channel.

* * * * *